3,383,426
HYDROFORMYLATION PROCESS FOR
POLYMERS
Neville Leverne Cull, Baker, and Joseph Kern Mertzweiller and Horace Marion Tenney, Baton Rouge, La., assignors to Esso Research and Engineering Company, a corporation of Delaware
No Drawing. Filed Sept. 9, 1963, Ser. No. 307,359
7 Claims. (Cl. 260—635)

This application relates to a process for preparing hydroxylated polymers and particularly a two-stage process for preparing hydroxylated polymers wherein carbonylation is maximized and hydrogenation is minimized in the first stage followed by hydrogenation of the product in the second stage with the same catalyst employed in the first stage.

It has been found that novel oxygenated hydrocarbon polymers, i.e., hydroxylated and carbonyl derivatives, can be prepared by reacting an olefinic polymer with carbon monoxide and hydrogen in the presence of a hydrocarbon soluble complex which contains a transition metal selected from Group VIII of the Periodic Chart, e.g., cobalt, in complex bond with at least one ligand consisting of a carbon monoxide molecule, and at least one biphyllic ligand which contains an atom selected from Group V–A of the Periodic Chart of the elements, e.g., phosphorus. The preferred forms of the hydrocarbon soluble complexes employed in the above reaction may be represented by the formulae:

(1) $[Co_2(CO)_6(PR_3)_2]$ and (2) $[(C_nH_{2n-1})Co(CO)_y(PR_3)]_x$ where R is a radical containing about 1 to 6 carbon atoms and is selected from the group consisting of alkyl and alkoxy and $x$ is 1 or 2 and $y$ is 1 or 2 with the proviso that when $x$ is 1 then $y$ is 2 and when $x$ is 2 then $y$ is 1. Complexes conforming to the above formulae and containing the alkyl and alkoxy radicals defined above are referred to herein as "phosphine" and "phosphite" catalyst complexes, respectively.

Highly useful polymers may be prepared by utilization of such catalyst complexes. These polymers comprise the hydroformylation products of unsaturated hydrocarbon polymers having molecular weights of from about 300 to 1,000,000 and have had about 5% to 100% of said unsaturation replaced with —$CH_2OH$ and —CHO. In terms of oxygen content of these polymers, this represents an oxygen content of from 0.5 to almost 20% by weight, the predominant portion of which is present as primary alcohol groups and aldehyde groups.

It is known that the functionality of these polymers can be controlled to a certain degree by the choice of the type of catalyst and the reaction conditions employed. Thus, it is possible to introduce a predominance of carbonyl or, conversely, a predominance of hydroxyl functionality into the polymers. While this ability to control the introduction of functionality types into the polymer is of very definite advantage, this known technique has the inherent disadvantage that complete control of the type of functionality introduced cannot be effected. Therefore, while an essentially completely hydroxylated polymer would have broad areas of application and hence be highly desirable, prior to the present invention, production of such a polymer would not have feasible. Consequently, a process resulting in a polymer which is completely hydroxylated, i.e., one wherein any carbonyl groups contained therein have been converted to hydroxyl groups, would represent a considerable advance in the art.

It is an object of the present invention, therefore, to provide a process for the production of an essentially completely hydroxylated polymer. Other objects will appear hereinlater.

Broadly, the above object is achieved by utilizing a two-stage process in which process conditions in the first stage are set to maximize oxonation and minimize hydrogenation of unsaturated carbon-carbon linkages, followed by a second stage operating under maximum hydrogenation conditions. Hence, in accordance with the present invention such hydroxylated polymers are produced in a two-stage process which comprises reacting, in a first stage, an unsaturated hydrocarbon compound having a molecular weight of from 300 to about 1,000,000 with carbon monoxide and hydrogen in the presence of a hydrocarbon soluble complex having the formulae:

(3) $[Co_2(CO)_6(PR_3)_2]$ and (4) $[(C_nH_{2n-1})Co(CO)_y(PR_3)]_x$ where R is an alkyl radical containing about 1 to 6 carbon aotms, $n$ is an integer of from 3 to 6 and $x$ is 1 or 2 and $y$ is 1 or 2 with the proviso that when $x$ is 1 then $y$ is 2, and when $x$ is 2 then $y$ is 1, to produce a carbonylated intermediate polymer and, in a second stage, reacting said intermediate polymer with hydrogen and from 10 to 200 p.s.i.g. partial pressure of CO in the presence of a catalyst as set forth above and recovering the resulting hydroxylated ploymer.

It should be noted that the foregoing process is concerned with a reaction different than that heretofore disclosed for certain other hydroformylation reactions, for example, treatment of product containing dicobalt octacarbonyl (i.e., $Co_2(CO)_8$) with hydrogen at high pressures and at near reaction temperatures. In such type of operation the $Co_2(CO)_8$ decomposes to metallic cobalt which then functions as a hydrogenation catalyst. This has been found to be not too active a system and extremely high pressures, e.g., 5000–10,000 p.s.i.g. or even higher, are usually required to effect appreciable hydrogenation of the carbonyl group.

In contrast, in the process of the present invention a very rapid hydrogenation is achieved which will hydrogenate not only the carbonyl group but also the internal unsaturation in the polymer chain. Thus, by utilization of the instant process, hydrogenation may be carried out to almost any degree ranging from a completely saturated hydroxylated polymer to a hydroxylated polymer with appreciable amounts of residual unsaturation. It is also within the scope of the present invention to produce a polymer in which only a portion of the aldehyde groups is hydrogenated with varying amounts of residual unsaturation. Other advantages accruing by conducting the process according to the present invention are:

(1) Catalyst requirements are lower than in the prior art processes which aids in subsequent decobalting operations.

(2) Equipment utilized is of a simpler and less costly nature than the high pressure equipment heretofore utilized in hydrogenation operations.

(3) By minimizing hydroxylating in the first stage, less cross-linking of the polymer will occur, i.e., either by cross-linking of hydroxyls to form ethers, or by an acetal or hemiacetal mechanism.

(4) By minimizing hydrogenation in the first stage, the number of available sites for oxonation is increased, thus enabling introduction of the desired amount of functionality into the polymer in a shorter time, while reducing possibility of side reactions and the size requirements of the first stage reactor.

The process of the present invention is generally applicable to the hydroformylation of any hydrocarbon polymer having at least one ethylenic carbon to carbon bond in said polymer. Thus, polymers having type I (pendant vinyl) unsaturation, type II (internal cis or trans) unsaturation, type III (tertiary) unsaturation, type IV (tri substituted) unsaturation or polymers having more than one of such types may be employed in the process of this invention. Certain types of unsaturation are found to be preferred over the others, however, and therefore type I (pendant vinyl) and type III (tertiary) unsaturation are most preferably present in the hydrocarbon polymer with type II (internal cis or trans) and type IV (tri substituted) unsaturation following in that order. The hydrocarbon polymers suitable for use in the present process are further characterized by their molecular weight, viz. about 300 to about 1,000,000 or more. The polymers amenable to the hydroformylation reaction of this invention may be oily, elastomeric plastic, and the like type polymers prepared by any suitable polymerization process. Thus, included are the Buton resins, elastomeric polybutadienes, styrene-butadiene rubber, natural rubber, and ethylene-propylene-diolefin tripolymers. The basic requirement is that the polymers contain one or more of the types of unsaturation set forth above and in sufficient quantity that they undergo reaction with the type of catalysts described herein.

It has been found that diolefin polymers or copolymers of a diolefin with a mono-olefin are especially amenable to the present invention. Therefore, polybutadiene, polypentadiene, polycyclopentadine, polyisoprene, and mixtures, or copolymers of one or more of these diolefins and the like are examples of preferred polymers. Examples of the preferred copolymers of diolefins with mono-olefins contemplated by the present invention are butadiene-styrene copolymers, pentadiene-styrene copolymers, isoprene-styrene copolymers, and also copolymers of the diolefins with aliphatic mono-olefins, methyl styrene, and the like.

Especially amenable as starting polymers in the present invention are commercial polybutadienes or copolymers of butadiene and styrene of molecular weights in the range of about 300 to about 4,000, for example, Buton 100 of molecular weight 2500–4000 and Buton 150 of molecular weight 1500–2000.

The hydrocarbon polymers employed in the present invention may generally be prepared by any method known to the art, for example, by the use of a sodium or lithium alkyl or free radical catalyst.

The polymers are generally employed in an inert hydrocarbon medium which may be either paraffinic or aromatic-type solvents, the latter being preferred. The polymer may also be employed without a diluent.

In general, the hydrocarbon soluble complexes used as catalysts in both stages of the process of the present invention are oxo-type catalysts and can be broadly represented by the following formulae:

(5) 

and (6) 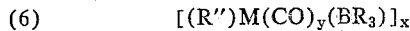

where in both Formula 5 and Formula 6 M is a transition metal selected from the group consisting of iron, cobalt, and rhodium, and preferably is cobalt; B is a group V–A atom selected from the group consisting of phosphorus and arsenic, and preferably is phosphorus; R is an alkyl radical containing from 1 to about 20, and preferably 1 to 6 carbon atoms and in Formula 6 R″ represents a pi-bonded conjugated diolefin or allylic structure containing 3 to 6 carbon atoms; $x$ is 1 or 2 and $y$ is 1 or 2 with the proviso that when $x$ is 1 then $y$ is 2, and when $x$ is 2 then $y$ is 1.

The preferred forms of the complexes employed in both stages of the process of the present invention, however, are represented by Formulae 3 and 4, above, which are set forth again as follows:

(3) 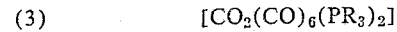

and (4) 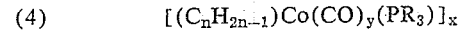

where in both Formula 3 and Formula 4, R is an alkyl radical containing from 1 to 6 carbon atoms, and in Formula 4, $n$ is an integer from 3 to 6, and $x$ and $y$ are as defined above.

With regard to the complexes employed in both stages of the present invention, it should be noted that some of the catalytic species may be isolated in a stable crystalline form which has unique and unusual properties. Further, all of these active catalyst species are extremely soluble in both hydrocarbon and polar solvents and in the latter solvents exhibit the conductivity of a typical weak electrolyte. However, the infrared spectrum of each of the catalysts is the same in all solvents in which it has been measured, thereby indicating no reaction with the solvent.

It should also be noted that properties and catalytic behavior of the complexes can be greatly influenced by the nature of the R group in the biphyllic ligand. In this regard, steric factors are believed to be particularly important and, for this reason, alkyl groups are preferred to aryl groups. The analyses and physical properties of the catalytically active complexes are best explained by means of phosphorus bridging groups in the molecule and it is these phosphorus bridging groups which confer the solubility properties and the steric properties necessary for high catalytic activity and unusual conductivity, and stability behavior, and absence of crosslinking tendencies of these catalyst systems.

Preparation of the complexes employed in both stages of the process of the present invention is described more fully in copending applications, Ser. No. 256,258, now U.S. Patent 3,310,576 and Ser. No. 256,260, now abandoned of Mertzweiller and Tenney, both filed Feb. 5, 1963. It should be understod, however, that the scope of the instant application should be in no way restricted in view of the above disclosures.

In broad terms, the first stage hydroformylation reaction step of the present invention is effected by intimately contacting an olefinic hydrocarbon polymer with carbon monoxide and hydrogen in the presence of the phosphine catalyst complex hereinbefore described at hydroformylation temperature and pressure. In this first stage, conditions are set to maximize carbonylation and minimize hydrogenation.

The first stage reaction may be performed at pressures of from 300 to 2000 p.s.i.g., and preferably at pressures of from 500 to 1200 p.s.i.g.

The first stage reaction temperturcs employed are in the range of from 275 to 425° F., and are preferably in the range of from 300 to 400° F.

The reaction time in the first stage is from 30 minutes to 5 hours and preferably is from 1 to 3 hours.

The molar ratio of hydrogen to carbon monoxide is not especially critical and may be varied to some extent. Suitably, the ratio employed will be about 1:1. It has been found, however, that by increasing the $H_2/CO$ ratio to about 3:1, the rate of reaction, as well as the yield of carbonylated product may be increased. While ratios higher than the foregoing, for example, 10:1 or higher, may be employed, there is no advantage in using said higher ratios.

The use of low catalyst concentrations, that is, 0.05 to 0.5 wt. percent as metal based on the weight of the polymer, is preferred in the process of the present invention. The preferable range includes catalyst concentrations as low as 0.1 to 0.40 wt. percent as metal based on the weight of the polymer.

Use of the first stage reaction temperature set forth above, e.g., 300–400° F., using 1/1 ratio of $H_2/CO$ gas at 500–1200 p.s.i.g. total pressure results in a predominance of aldehydic products. At these conditions, the hydroformylation is quite selective, there is little competing hydrogenation, and the residual unsaturation depends primarily upon the amount of functionality introduced. It should be noted here, however, that the phosphine catalyst as defined above must be employed as the product obtained with use of the phosphite catalyst system differs from that obtained with use of the phosphine catalyst. Such difference resides in that the product resulting from phosphite use contains two distinct types of aldehyde groups as shown very markedly by infrared bands as compared to the single type of aldehyde group resulting from phosphine use. It has been demonstrated that the two aldehyde groups show different orders of activity and consequently the two types of hydroformylated polymers expectedly exhibit different end-use properties. While not wishing to be restricted to the theory proposed, it is believed that the second carbonyl band is due to a conjugated system resulting from isomerization activity of the phosphite catalyst.

The second stage hydrogenation reaction may be performed at pressures of from 100 to 3000 p.s.i.g., and preferably at pressures of from 1000 to 1500 p.s.i.g.

The second stage reaction temperatures employed are in the range of from 325 to 450° F., and are preferably in the range of from 375 to 425° F.

The reaction time in the second stage is from 0.5 to 6 hours, and preferably is from 1 to 2 hours.

Hydrogenation of the intermediate aldehydic product of stage 1 is preferably effected with the same catalyst used in the first stage although additional catalyst may be added, if desired.

In the second stage, an extremely rapid hydrogenation is achieved which will hydrogenate not only the carbonyl group but also internal unsaturation in the polymer chain. This is believed to proceed with a homogeneous catalyst system which activates hydrogen, the primary component of which being the complexes as hereinbefore described, and very probably previously undisclosed metal hydrocarbonyls containing phosphorus ligands, e.g., $H[CoCO)_3PR_3]$ and $H[C_nH_{2n-1})Co(CO)PR_3]$, which are now found to be unusually stable and active hydrogenation catalysts. It is, therefore, preferable to avoid conversion of the complexes to metallic forms of cobalt, even in colloidal forms. This object is accomplished by retaining sufficient CO partial pressure, for example, about 10 to 500 p.s.i.g., and preferably about 30 to 90 p.s.i.g., to stabilize the system. While relatively small amounts of decomposition may be encountered, approximately all of the catalyst complex can be removed later by any suitable means known to the art, for example, acid extraction, thermal decomposition, electromagnetic precipitation, and the like.

It must be noted here, as in the first step, that the type of catalyst complex employed is critical, for when phosphine and prosphite type intermediate products are subjected to hydrogenation conditions in the presence of such phosphine and phosphite catalysts, different behaviors are again observed. While the phosphine catalyst complex shows excellent hydrogenation activity and converts essentially all the aldehyde groups to primary alcohol groups and saturates the residual unsaturation, the phosphite catalyst exhibits more selective hydrogenation activity and tends to hydrogenate the unsaturated linkages in preference to the carbonyl groups. Thus, a final product, which is predominantly aldehydic but low in unsaturation, results from use of the phosphite catalyst complex.

The ability to introduce hydroxyl functional groups exclusively into unsaturated polymers having the broad molecular weight range hereinbefore set forth offer broad areas for the application of the resulting hydroformylation hydrogenation products. For example, the hydroxylated products of this invention may be employed as plasticizers for resins, coating material, adhesives, and the like.

The following examples specifically illustrate the invention.

Example I

A 300 cc. stirred autoclave was charged as follows:

130 gms. of 40% polybutadiene (ca. 2000 mol. wt.) in solution in xylene.
4.3 gms. of catalyst solution prepared by slurrying 20 gms. of $[Co_2(CO)_7(P(C_4H_9)_3)_2]$ in 100 gms. of n-hexane and heating at 395° F. for 35 minutes under 430–490 p.s.i.g. synthesis gas.

The autoclave was pressured cold to 600 p.s.i.g. with synthesis gas and heated to 350° F. The reaction was continued under these conditions while maintaining a flow of synthesis gas through the system to maintain constant $H_2/CO$ ratio (1/1). The flow was measured at about 0.5 liter/minute. Samples were withdrawn after 1, 2, and 3 hours on conditions and analyzed as follows:

| Sample, hrs. | Wt. Percent $O_2$ on Polymer | Unsaturation Remaining [1] | |
|---|---|---|---|
| | | Type I | Type II |
| 1 | 2.20 | 84 | 100 |
| 2 | 4.25 | 66 | 100 |
| 3 | 6.02 | 58 | 100 |

[1] As percent of unsaturated type in feed polymer.

Since the original polymer contained about 70% type I unsaturation and 30% type II, the disappearance of 42% type I unsaturation corresponds to a calculated 5.5 wt. percent oxygen in the polymer. This is in good agreement with the determined value of 6.02% and is also an indication that there is no appreciable competing hydrogenation of the polymer under these conditions.

After continuing the reaction for a total of 217 minutes, a sample was withdrawn and analyzed by KOH numbers as follows:

Carbonyl No.                              Hydroxyl No.
mg. KOH/gm. polymer:     mg. KOH/gm. polymer
60 ------------------------------------- 93

This corresponds to an estimated average of about 3 carbonyl (aldehyde) groups and 4 hydroxyl groups per polymer molecule.

The pressure (syn. gas) on the autoclave was reduced to 200 p.s.i.g. and then increased to 1730 p.s.i.g. with pure hydrogen. The temperature was simultaneously increased to 385° F. The initial gas absorption rate was about 100 lbs./minute which decreased to 1 lb./minute after 50 minutes at 1600–1700 p.s.i.g. and 385° F. The KOH numbers on the product were as follows:

Carbonyl No.                              Hydroxyl No.
mg. KOH/gm.:                       mg. KOH/gm.
0 ------------------------------------- 184

This corresponds to an average of about 8 primary hydroxyl groups/molecule. The infrared spectra showed that no type I unsaturation and only 46% of the original 30% type II unsaturation remained in the polymer.

Example II

In a manner similar to that of Example 1, a 300 cc. autoclave was charged as follows:

50 gms. of polybutadiene (ca. 2100 mol. wt.) which contained about 70% type I unsaturation.
50 gms. of n-hexane.
2 gms. of catalyst comprising $[C_4H_7Co(CO)_2P(C_4H_9)_3]$ The autoclave was pressured with synthesis gas (1.4/1 $H_2/CO$) to 500 p.s.i.g. for 2⅓ hours. The reactor was cooled, and purged free of gas (except dissolved gas) pressured to 100 p.s.i.g. with $H_2$ and heated to 380° F.

In 30 minutes there was no gas absorption. A sample was withdrawn and examined by infrared. It showed strong OH absorption at 3.0 microns and $CH_2OH$ absorption at 9.5 microns, moderate CO absorption at 5.8 microns and strong metal-CO absorption at 5.1 microns, the latter bond indicating that the catalyst was fairly stable under these conditions (CO partial pressure estimated about 10 p.s.i.g.). The hydrogen pressure was then increased to 1000 p.s.i.g. and a rapid pressure drop noted as follows:

| Time (Min. from start) | Cumulative Pressure Drop (Atms.) | Atms./Min. |
|---|---|---|
| 15 | 7.5 | 0.5 |
| 30 | 14.3 | 0.45 |
| 60 | 16.3 | 0.067 |
| 105 | 17.7 | 0.031 |

A sample of product withdrawn after 30 minutes at the high pressure showed a major portion of the catalyst present as the complex (5.1 micron band). The hydrogenation transitions as measured by ratios of the principal infrared bands are illustrated below:

| Time, Min. | OH/CO | OH/Type I Olefin | OH/Type II Olefin |
|---|---|---|---|
| Start | 1.05 | 1.7 | 0.37 |
| 30 | 3.4 | ∞ | 1.3 |
| 105 | 5.8 | ∞ | 3.9 |

Example III

A feed blend of polybutadiene polymer (Buton) in toluene (30% NVM) was prepared. To this was added 10 wt. percent of a toluene solution of the butylphosphine modified cobalt octacarbonyl catalyst; cobalt equals 1.4% and thus equals 0.13 wt. percent cobalt based on feed. The feed was charged to a feed burette and pumped into a 2 liter Parr pressure reaction vessel. Product was withdrawn through a dipleg at a rate comparable to the feed rate and collected in an accumulator. Hydroformylated product was periodically withdrawn from the accumulators, weighed, nitrogen blanketed and stored prior to hydrogenation.

The following conditions were maintained during the run:

| | |
|---|---|
| Temperature, °F. | 350–360 |
| Synthesis gas pressure, p.s.i.g. | 600 |
| Synthesis gas, $CO/H_2$ ratio | 1/1.25 |
| Feed rate, cc./hr. | 900 |
| Catalyst concentration, wt. percent Co | 0.13 |
| Exit gas rate, l./min. | 2–3 |
| Length of run, hrs. | 12 |

Samples of product were submitted for oxygen analysis. The oxygen content after a brief lining out period (1 hour) averaged between 5 and 6 wt. percent based on polymer.

Example IV

Six hundred and tweny-four grams of product from Example III (CHUC-3 cuts 7, NVM 30.1, $O_2$=5.7 wt. percent) were hydrogenated in a 2-liter autoclave under the following conditions:

| | |
|---|---|
| Time, min. | 113 |
| Temp., °F. | 390–400 |
| $H_2$ press., p.s.i.g. | 1400–1500 |
| ΔP, lbs. | 500 |

The product was extremely dark and gave evidence of colloidal cobalt. No purging with synthesis gas was used. Filtering did not help reduce color. Product was not worked up.

Example V

Another portion of the product from Example III was hydrogenated (CHUC-3 cuts 4, NVM 30.3, $O_2$=5.5%; 5 NVM 30.1, $O_2$=5.1%; 6 NVM 30.6, $O_2$=5.8%) under the following conditions:

| | |
|---|---|
| Time, min. | 90 |
| Temp., °F. | 390–400 |
| $H_2$ press., p.s.i.g.[1] | 1400–1500 |
| ΔP, lbs. (avg.) | 770 |

[1] Purged bomb with synthesis gas-pressured to 400 p.s.i.g. with syn. gas during heatup.

The resulting product was light yellow in color. The hydrogenated product was composited and the following inspections were obtained:

| | |
|---|---|
| NVM, wt. percent | 37.4 |
| Oxygen, wt. percent[1] | 7.0 |
| Hydroxyl No.[1] | 237 |
| Carbonyl No.[1] | 9 |
| Cobalt, p.p.m.[1] | 246 |

[1] 100% polymer basis.

The foregoing examples illustrate:

(1) The continuous hydroformylation of Buton polymer is feasible.

(2) Hydrogenation with no synthesis gas purge or CO partial pressure is less complete (as shown by ΔP ($H_2$ uptake)) and results in a product in which the cobalt is difficult to remove.

(3) With synthesis gas purging and a synthesis gas pressure of about 400 p.s.i.g., hydrogenated product of good color and with low carbonyl content was obtained.

What is claimed is:

1. The method of preparing hydroxylated polymers which comprises reacting in a first stage at temperatures of about 300–400° F. and pressures of about 300–2000 p.s.i.g. an unsaturated hydrocarbon compound having a molecular weight of from about 30 to about 1,000,000 with carbon monoxide and hydrogen in an $H_2$/CO molar ratio of about 1:1 in the presence of a hydrocarbon soluble complex selected from the class consisting of the following general formulae:

(I)            $[M_2(CO)_6(BR_3)_2]$ and (II)          $[(R')M(CO)_y(BR_3)]_x$ where in Formulae I and II, M is a transition metal selected from the group consisting of iron, cobalt and rhodium, B is a Group V–A atom selected from the group consisting of phosphorus and arsenic, R is an alkyl radical containing from 1 to about 20 carbon atoms, in Formula II, R' is a pi-bonded conjugated diolefin containing from 3 to 6 carbon atoms, $x$ is an integer from 1 to 2, $y$ is an integer from 1 to 2, with the proviso that when $x$ is 1, then $y$ is 2, and when $x$ is 2, than $y$ is 1, to produce an intermediate carbonylated polymer, and in a second stage reacting said carbonylated polymer with hydrogen at temperatures of about 375–425° F. and pressures of about 500–3000 p.s.i.g. and about 10 to 200 p.s.i.g. partial pressure of carbon monoxide in the presence of said hydrocarbon soluble complex.

2. The method of claim 1 in which the unsaturated hydrocarbon polymer is selected from the group consisting of diolefin homopolymers and copolymers of a diolefin with a mono-olefin.

3. The method of claim 1 in which the hydrocarbon soluble complex is employed in amounts of from 0.05 to 0.5 weight percent as metal based on the polymer.

4. The method of preparing hydroxylated compounds which comprises reacting in a first stage at temperatures of about 300–400° F. and pressures of about 300–2000 p.s.i.g. a hydrocarbon polymer containing olefinic unsaturation with carbon monoxide and hydrogen in an $H_2$/CO molar ratio of about 1:1 in the presence of a catalytic amount of a hydrocarbon soluble complex having the formula:

$[Co_2(CO)_6(PR_3)_2]$ wherein R is an alkyl radical containing from 1 to 6 carbon atoms to produce an intermediate carbonylated polymer, and in a second stage reacting said carbonylated polymer with hydrogen at temperatures of about 375–425° F. and pressures of about 500–3000 p.s.i.g. and 10 to 200 p.s.i.g. partial pressure of carbon monoxide in the presence of the same hydrocarbon soluble complex.

5. The method of claim 4 in which the polymer is a butadiene polymer having a molecular weight of from about 300 to about 4000.

6. The method of preparing hydroxylated compounds which comprises reacting in a first stage at temperatures of about 300–400° F. and pressures of about 200–2000 p.s.i.g. a hydrocarbon polymer containing olefinic unsaturation with carbon monoxide and hydrogen in an $H_2/CO$ molar ratio of about 1:1 in the presence of a catalytic amount of a hydrocarbon soluble complex having the formula:

$$[(C_nH_{2n-1})Co(CO)_y(PR_3)]_x$$

where R is an alkyl radical containing from 1 to 6 carbon atoms, $n$ is an integer of from 3 to 6, $x$ is an integer of from 1 to 2, and $y$ is an integer of from 1 to 2, with the proviso that when $x$ is 1, then $y$ is 2, and when $x$ is 2, then $y$ is 1 to produce an intermediate carbonylated polymer, and in a second stage reacting said carbonylated polymer with hydrogen at temperatures of about 375–425° F. and pressures of about 500–3000 p.s.i.g. and 10 to 200 p.s.i.g. partial pressure of carbon monoxide in the presence of the same hydrocarbon soluble complex.

7. The method of claim 6 in which the polymer is a butadiene polymer having a molecular weight of from about 300 to about 4000.

References Cited
UNITED STATES PATENTS

| | | | |
|---|---|---|---|
| 3,118,948 | 1/1964 | Cull et al. | 260—604 |
| 3,168,553 | 2/1965 | Slaugh | 260—439 |
| 3,231,621 | 1/1966 | Slaugh | 260—85.1 |

JAMES A. SEIDLECK, *Primary Examiner.*

J. L. SCHOFER, *Examiner.*

W. HOOVER, *Assistant Examiner.*